United States Patent [19]

Gotanda

[11] Patent Number: 5,041,810

[45] Date of Patent: Aug. 20, 1991

[54] ANTITHEFT DEVICE FOR AN AUTOMOBILE

[76] Inventor: Motohiro Gotanda, 1802-10, Nakabiyo, Abiko-shi, Chiba-ken, Japan

[21] Appl. No.: 471,920

[22] Filed: Jan. 29, 1990

[30] Foreign Application Priority Data

Feb. 3, 1989 [JP] Japan ................................. 1-23810

[51] Int. Cl.[5] ........................ B60R 25/10; B60R 25/04
[52] U.S. Cl. .................................. 340/426; 340/542;
340/543; 340/528; 307/10.3; 307/10.4;
307/10.5; 361/171; 180/287
[58] Field of Search ............... 340/426, 542, 528, 543,
340/825.31; 307/10.1, 10.3, 10.4, 10.5, 10.6;
361/171, 172; 180/271, 279, 283, 287, 173, 174

[56] References Cited

U.S. PATENT DOCUMENTS

| | | | |
|---|---|---|---|
| 4,064,547 | 12/1977 | Zagwyn | 361/172 |
| 4,446,380 | 5/1984 | Moriya et al. | 361/172 |
| 4,811,013 | 3/1989 | Akutsu | 307/10.2 |
| 4,888,575 | 12/1989 | De Vaulx | 307/10.5 |

Primary Examiner—Donnie L. Crosland
Attorney, Agent, or Firm—Jordan and Hamburg

[57] ABSTRACT

Automobiles such as a cash carrying car, truck, police car and so on, are prevented from being ridden away during loading or unloading cash or goods or being robbed by robbers after having been forcibly stopped on road. When a door of the automobile is opened, a opened-door detection switch operates and a first-control means stores in its memory the switch's action and cuts off an engine start-up circuit. The engine can be restarted when a registered password is entered into the device through a password inputting means, whereby a second-control means stores the signal and enters a resetting signal into the first control means to restore the engine start-up circuit. At the same time, a resetting signal produced by a reset signal generating means is inputted into the second control means which is thereby restored to the initial state.

9 Claims, 1 Drawing Sheet

ANTITHEFT DEVICE FOR AN AUTOMOBILE

BACKGROUND OF THE INVENTION

The present invention relates to an antitheft device for use in any kind of automobile such as a cash carrying car, a truck, a police car and so on, and more particularly to a system for preventing a car or a truck from being ridden away during loading or unloading cash or goods or for preventing the car or the truck from being robbed by robbers after it having been forcibly stopped on road.

There have been frequent robberies of cash carrying cars and the like and various systems have been also proposed as a countermeasure, for example, to strictly hold a key or to make it impossible to start the automobile by key without preliminary inputting a correct password specified for said automobile.

The above-mentioned countermeasure for inputting the specified password has such a drawback that it is helpless against the robbers' attack if the car engine has been started.

SUMMARY OF THE INVENTION

It is an object of the present invention to provide a antitheft device for an automobile, which prevents the automobile from being ridden away by making its engine start-up circuit inoperative when the door is opened, thus being free from the above-mentioned drawback of the prior art.

BRIEF DESCRIPTION OF THE DRAWINGS

The side FIGURE is a circuit diagram for showing an embodiment of the present invention.

DESCRIPTION OF THE PREFERRED EMBODIMENTS

Figure 1:
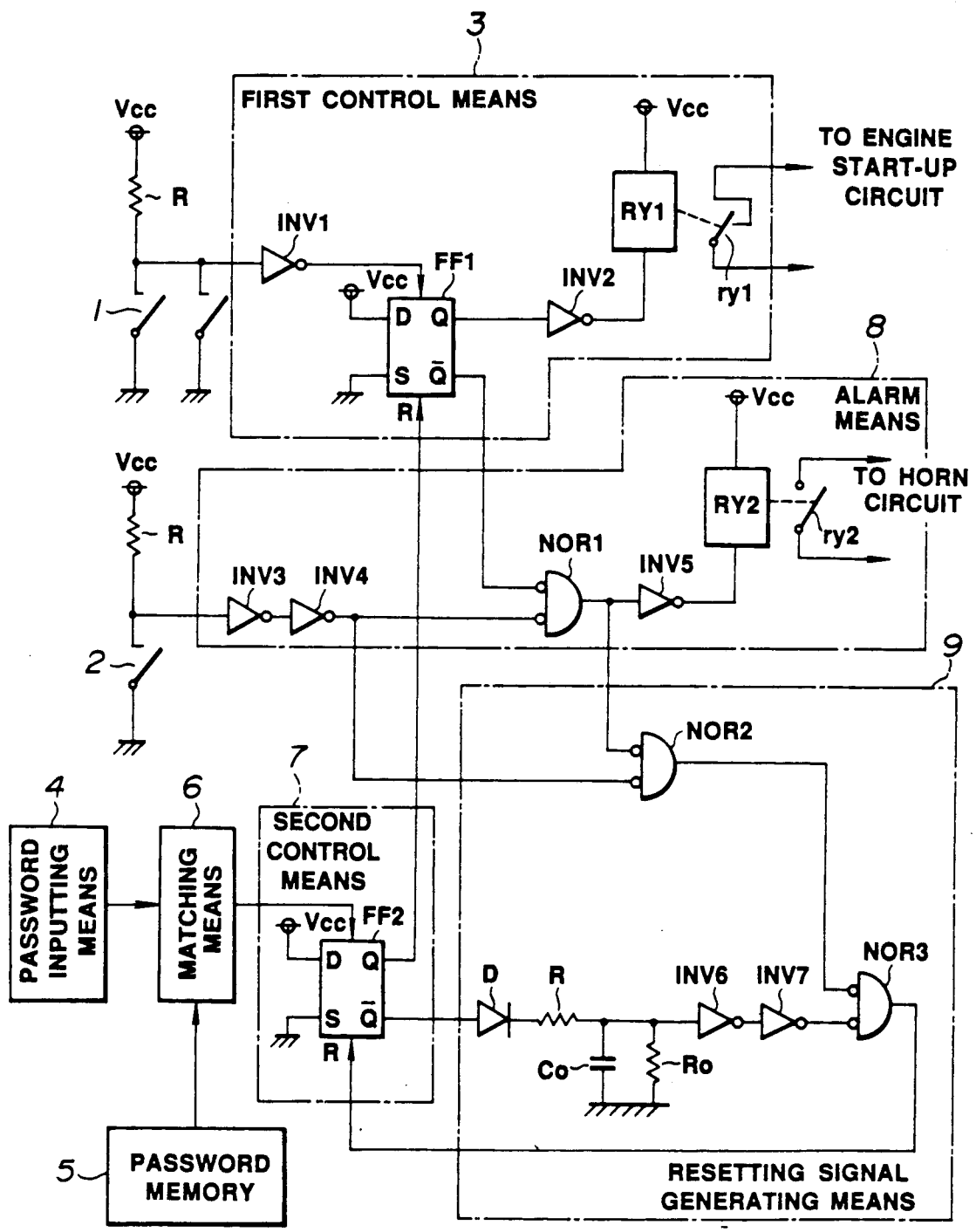

An antitheft device for an automobile according to the present invention includes a plurality of opened-door detection switches for detecting the automobile's door in opened state, a first-control means for storing the operation of the detecting switch in its memory until a resetting signal is inputted and for retaining an engine start-up circuit in cut-off state for the period of keeping a memory of the detecting switch's operation, a password inputting means for inputting a registered signal, a second-control means for acting at the time of inputting the registered signal, for keeping the action until the resetting signal having been inputted and for inputting a resetting signal into the first control means for the period of keeping a memory of its own acting state, a reset signal generating means for restoring the second control means into its initial state by inputting a resetting signal into the second control means.

The antitheft device for preventing an automobile from being ridden away, according to the present invention, can operate as follows: When a door of the automobile is opened, a opened-door detection switch operates and a first-control means stores in its memory said switch's action and cuts off an engine start-up circuit thereby making it impossible to start up the engine by turning the key.

Restarting the engine becomes possible when a registered password is entered into the device through a password inputting means, thereby a second-control means stores said signal and enters a resetting signal into the first control means to restore the engine start-up circuit. At the same time, a resetting signal produced by a reset signal generating means is inputted into the second control means which is thereby restored into the initial state.

Consequently, when any door is opened again, the device can operate to cut off the engine start-up circuit and to maintain said circuit inoperative as far as the password is not inputted.

The FIGURE is a circuit diagram showing an embodiment of the present invention. In the drawing, there are shown two opened-door detection switches 1, each of which serves for one of the automobile's doors and is set in OFF state, as in FIGURE, when the door is shut, and becomes ON when the door is opened. Microswitches, reed switches and other switches may be also used for the above-mentioned purpose. Especially, it is very convenient to use reed switches since they may be mounted at door frame side by mounting corresponding permanent magnets for them at door side. It is also convenient to set each opened-door detection switch 1 so that it may be closed when the door was opened to the extent allowing the human body to pass therethrough. Frequent operation of the system with a minute opening of the door may be thus avoided. An opened-bonnet detection switch 2 turns ON when the bonnet (i.e. hood) opened and it turns OFF when the bonnet is shut.

A first-control means 3 includes two inverters INV1 and INV2, a flip-flop FF1 and a relay RY1 with its contact ry1. When the opened-door detection switch 1 closes, the first control means operates to open the engine start-up circuit by breaking the relay contact ry1. A password inputting means 4 may be a keyboard, magnet card, IC card, electronic keys or other means being capable of inputting a password predetermined for the automobile to be protected. 5 is a password memory (storage) 5 wherein the password for the automobile is stored, and 6 is a matching means whereby the password inputted by the password inputting means 4 is checked for correspondence with the password stored in the password memory 5 and an identifying signal is generated.

A second control means 7 comprising a flip-flop FF2 which receives the identifying signal from the matching means and changes its output to reset the first control means 3. An alarm means 8 including inverters INV3, INV4 and INV5, a NOR gate NOR1 and relay RY2 with its contact ry2 can generate a loud warning signal by closing a horn circuit at the time of opening the door and/or the bonnet. A reset signal generating circuit 9 which includes NOR gates NOR2 and NOR3, a delay circuit composed of a condenser Co and a resistor Ro, inverters INV6 and INV7 can generate a resetting signal to return the second control means to the initial state after a fixed time of delay. The FIGURE, a resistor and a diode are denoted by characters R and D respectively.

Operation of the device is explained as follows: A) the case of opening the automobile's door When the door is opened, the opened-door detection switch 1 turns ON to cause inverter INV1 produce a signal "High" whereby the flip-flop FF1 reverses its output and produces the signal "High" at its terminal "Q" and, therefore, the output of the inverter INV2 becomes "low" to energize the relay RY1 to open its contact ry1. Consequently, the engine start-up circuit is opened and the engine can not be started as long as the flip-flop is not reset. When the door is closed again and the opened-door detection switch 1 is turned OFF, the output of the inverter INV1 is maintained at "Low" level and the flip-flop FF1 remains as it is. The engine start-up circuit is still in OFF state.

(B) In case the bonnet is opened in the state (A)

When the bonnet is opened, the opened-bonnet detection switch 2 closes to cause the inverter INV4 to generate a signal "Low". Since in the state (A) the flip-flop FF1 has the "Low" level signal at its terminal Q, the output of the NOR gate NOR1 is turned to "High" and the output of the inverter INV5 becomes "Low", resulting in that the relay RY2 is energized to close its contact ry2 to turn ON the horn circuit, that is, the horn sounds to inform of the bonnet being opened.

(C) In case the engine is started by closing the door from the state (A)

The engine start-up circuit is kept in OFF state under the action of the first control means since the door was once opened. To restore said circuit to its initial state, the password is entered into the device by means of the password inputting means 4. The matching means 6 makes a check of the entered password by referring to the password stored in the password memory 5 and generates an identifying signal if the entered password has been proved to be correct. At the same time, the flip-flop FF2 changes its output inversely to produce at its terminal "Q" a signal of "High" level, namely, a resetting signal for returning the FF1 in the initial state. Consequently, relay RY1 is restored to make its contact ry1 closed for switching ON the engine start-up circuit. The engine is now operable.

On the other hand, the flip-flop FF1 is restored to have the output of "High" level at its terminal "Q" and the NOR gate NOR1 has the output of "Low" level. The flip-flop FF2 changes output level at its terminal "Q" from "High" to "Low" with discharging the accumulated electric charge from the condenser Co through the resistor Ro so as to delay the output of a "Low" level signal at the inverter INV7 for a certain period (for example, of 60 sec.). The NOR gate NOR3 thereby generates the output signal to reset the flip-flop FF2. The flip-flop circuit FF2 is thus automatically restored into the initial state.

The purpose of the above-mentioned delay operation is as follows:

When the flip-flop FF1 has the "Low" level signal at its terminal "Q", that is, before resetting the flip-flop FF2, the opened-bonnet detection switch 2 turns ON, the inverter INV4 changes its output to "Low" level and therefore the NOR gate NOR1 has the "High" level output, resulting that the relay RY2 operates to the switch ON the horn circuit. On the contrary, as far as the resetting signal from the flip-flop FF2 is applied to the flip-flop FF1, the flip-flop FF2 may have the "High" level signal at its terminal "Q" irrespective of whether the output of the inverter INV is "High" or "Low" and therefore the relay RY2 can not be energized. Namely, if the bonnet is once opened during the delay time determined by the delay circuit composed of the condenser Co and the resister Ro, the horn will not sound as the bonnet being in opened state.

Although in the above-mentioned embodiment a password is adopted for restarting the engine of the automobile, it is also possible to use any type of signal if it is registered in advance. It is allowed to specify the ON/OFF operations of the switches 1 and 2 in reverse to the above-described embodiment if an additional inverter is provided in the circuit.

Furthermore, it is also possible to use a plurality of passwords, for example, three kinds of passwords A, B and C which are stored in the memory 5 in such a way that they may become effective one by one in said order. In this case the driver is firstly informed of only one password A and drives the automobile to the first designated place. When the automobile was stopped and its door was opened, the password A becomes inoperative and the password B becomes effective to use. Therefor, the driver is informed of the second password B necessary for restarting the automobile's engine by radiotelephone from the control center. The third password C shall be used after the second password B comes out of use. Such a combination of passwords provides a complete protection against robbery.

If the driver stopped the automobile at a place where the instruction by radiotelephony from the control center can not be received, he must bring the automobile to a spot where the radio communication with the control center is possible. In view of the above-mentioned case, such a provision is also made that the automobile's engine may be driven only for a short time (for example, 30 seconds) by using the engine key or by putting an optional number into the antitheft device. Namely, the driver may drive the automobile to the necessary position by repeating the above-mentioned operation.

As is apparent from the foregoing description, since the antitheft device according to the present invention comprises a plurality of opened-door detection switches for detecting corresponding doors in opened state, a first-control means for storing the operation of said detecting switch in its memory till a resetting signal has been inputted and for keeping an engine start-up circuit in cut-off state for the period of storing the detecting switch's operating state, a password inputting means for entering a registered signal, a second-control means for making action at the time of inputting the registered signal and for keeping the action until the resetting signal having been inputted and for inputting a resetting signal into the first control means for the period of storing its own acting state, a reset signal generating means for restoring the second control means in its initial state by inputting a resetting signal into the second control means, the device is capable of cutting off the engine start-up circuit by the action of the first control means when the door is once opened, and of maintaining said circuit in OFF condition as far as the first control means is not restored by inputting the registered password. Accordingly, it is completely avoided that the automobile is ridden away if the driver gets out of said automobile with the key left therein. The great advantage of the device is to provide a complete antitheft means of the automobile such as a cash carrying car, truck, police car and so on.

I claim:

1. An antitheft device for an automobile, comprising;
    a plurality of opened-door detection switches for detecting the opening of door of the automobile;
    an engine start up circuit connected to inhibit the starting of the engine of the automobile in a cut-off state of the start up circuit;
    a first-control means comprising a memory for storing the operation (ON state) of any of said detecting switches and holding said engine start up circuit in said cut-off state until a resetting signal has been inputted thereto;

a password inputting means for generating an identifying signal in response to the input of a password thereto;

a second-control means connected to be responsive to the generation of said identifying signal for generating a resetting signal and for applying the resetting signal to the first control means for thereby removing said engine start up circuit from said cut-off state; and a reset signal generating means connected to be responsive to the generation of said resetting signal for controlling said second control means to stop the generation of said resetting signal.

2. An antitheft device for an automobile according to claim 1, further comprising a warning means and an opened-bonnet detection switch connected to actuate said warning means when said open-bonnet detection switch and the opened-door detection switch are operated.

3. An antitheft device for an automobile according to claim 1, wherein said reset signal generating means comprises means for resetting the second control means with a certain delay time after activation of the second control means by said identifying signal.

4. An antitheft device for an automobile according to claim 1, wherein the password inputting means comprises a keyboard or a magnetic card or an IC card or an electronic key.

5. An antitheft device for an automobile according to claim 1, wherein the opened-door detection switch consists of a reed switch installed on the door frame of said automobile and a permanent magnet installed on the door of said automobile.

6. An antitheft device for an automobile according to claim 1, wherein the opened-door detection switch is mounted to be actuated when the door of said automobile is opened to such a degree that a person may pass therethrough.

7. An antitheft device for an automobile according to claim 1, wherein said password inputting means comprises a password memory and a matching means connected to compare a password inputted through the password inputting means with a password stored in the password memory and, when both passwords are matched with each other, to generate said identifying signal.

8. An antitheft device for an automobile according to claim 7, wherein said password memory has a plurality of passwords stored therein adapted to be sequentially compared with input passwords in a given order.

9. An antitheft device for an automobile according to claim 8, comprising means for giving the identification of a password to be used to a driver of the automobile by radio-communication from a control center.

* * * * *